United States Patent
Alexander et al.

(10) Patent No.: US 10,911,270 B2
(45) Date of Patent: Feb. 2, 2021

(54) SYSTEMS AND METHODS FOR ON-CHIP FILTERING

(71) Applicant: Maxim Integrated Products, Inc., San Jose, CA (US)

(72) Inventors: Daniel David Alexander, Mesa, AZ (US); Daniel James Miller, Gilbert, AZ (US); Feihua Zhang, Gilbert, AZ (US); Jason R. Ferguson, Mesa, AZ (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 16/590,254

(22) Filed: Oct. 1, 2019

(65) Prior Publication Data

US 2020/0112460 A1 Apr. 9, 2020

Related U.S. Application Data

(60) Provisional application No. 62/740,661, filed on Oct. 3, 2018.

(51) Int. Cl.
*H04L 25/03* (2006.01)

(52) U.S. Cl.
CPC ............... *H04L 25/03828* (2013.01)

(58) Field of Classification Search
CPC ............... H04L 25/03; H04L 25/03828
USPC ............... 375/224, 227, 228, 229, 232, 236
See application file for complete search history.

(56) References Cited

U.S. PATENT DOCUMENTS

| 6,888,888 | B1 | 5/2005 | Tu et al. | |
|---|---|---|---|---|
| 7,589,516 | B2* | 9/2009 | Rzehak | G01R 22/10 |
| | | | | 324/107 |
| 8,731,644 | B2 | 5/2014 | Mehrotra et al. | |
| 8,755,460 | B2 | 6/2014 | Foote et al. | |
| 2004/0032357 | A1* | 2/2004 | White | G01R 21/133 |
| | | | | 341/155 |
| 2017/0176225 | A1* | 6/2017 | Fontes | G01D 5/24 |

OTHER PUBLICATIONS

Freescale Semiconductor, "Data Sheet, MC68HC0SAS32A", Jul. 14, 2005. Available from the Internet, <URL:https://www.nxp.com/docs/en/data-sheet/MC68HC08AS32A.pdf>, (296 pgs).

* cited by examiner

*Primary Examiner* — Siu M Lee
(74) *Attorney, Agent, or Firm* — North Weber & Baugh LLP (57) ABSTRACT

Described are systems and methods take advantage of properties of sinc filters that remove frequency components at specific integer multiples of a noise frequency. In various embodiments, sampling of multi-channel systems at sufficiently high rates allows for removal of unwanted signals and harmonics from multi-sample sequences. Advantageously, a multi-sample sequence scheduling scheme eliminates the need for noise filtering one channel at a time at each channel's own sampling rate using a separate filter.

20 Claims, 7 Drawing Sheets

512 — USE A SCHEDULER / SEQUENCER TO DETERMINE $F_{SAMPLE}$ (or $T_{SAMPLE}$) & OSR TO FACILITATE REJECTION OF A FREQUENCY (& HARMONICS) IN A SET OF ANALOG SIGNALS (e.g., cell voltages in a battery stack)

514 — USE THE SCHEDULER / SEQUENCER TO SCHEDULE A SELECTED SET OF ANALOG SIGNALS TO BE SAMPLED (e.g., in an arbitrary but fixed order)

516 — BASED ON THE SCHEDULE, USE A SAMPLER / CONVERTER TO SAMPLE THE SET OF ANALOG SIGNALS IN A MULTI-SAMPLE SEQUENCE AND ROUTE EACH SIGNAL (e.g., via a digital path selector) TO AN ACCUMULATOR OR FILTER 518 — IF DESIRED, USE ANY REMAINING TIME UNTIL $T_{SAMPLE}$ EXPIRES TO PERFORM OTHER PROCESSING OPERATIONS PRIOR TO SAMPLING SIGNALS ACCORDING TO THE NEXT MULTI-SAMPLE SEQUENCE 520 — OSR SATISFIED? — No (loop back to 516)

Yes

522 — OUTPUT RESULTING OVERSAMPLED DATA FOR THE SET OF SIGNALS THAT COMPRISES REDUCED FREQUENCY CONTENT AT THE REJECTION FREQUENCY

SYSTEMS AND METHODS FOR ON-CHIP FILTERING

CROSS-REFERENCE TO RELATED APPLICATIONS

The present application claims priority benefit, under 35 U.S.C. § 119(e), to commonly-assigned U.S. Provisional Patent Application No. 62/740,661, entitled "Systems and Methods for On-Chip Filtering," naming as inventors Daniel David Alexander, Daniel James Miller, Feihua Zhang, and Jason R. Ferguson, and filed Oct. 3, 2018, which application is herein incorporated by reference as to its entire content. Each reference mentioned in this patent document is incorporated by reference herein in its entirety.

TECHNICAL FIELD

The present disclosure relates generally to systems and methods for mixed signal processing. More particularly, the present disclosure relates to systems and methods for FIR filtering in mixed signal processing system.

BACKGROUND

Battery management systems (BMS) typically utilize mixed signal processing systems to monitor the condition of a battery, e.g., in an electric vehicle, by measuring parameters such as cell temperature to prevent overheating that, if undetected, may result in physical damage and may cause serious injury to nearby persons in case of an explosion or fire. Virtually all signal processing circuits are susceptive to various types of noise that may be generated internally or externally to the circuit. Oftentimes, the main source of line noise in a battery monitoring system is a rectifier that facilitates charging and discharging of a stack of cells in a battery pack. One of the undesired effects of noise, such as line (or mains) noise or system clock noise, is that the battery cannot be charged as fully as would be otherwise possible. In an electric vehicle, this leads to a reduction in the driving range. Line noise typically occurs at 50 Hz (e.g., in Europe) or 60 Hz (e.g., in the United States), i.e., the line frequency, and its harmonics with the first harmonic occurring at 100 Hz or 120 Hz, respectively.

Common approaches to eliminate excessive line noise or common mode noise involve the application of costly analog or digital filters. Infinite-Impulse-Response (IIR) filters, such as continuous averagers) are cost-effective; however, these exhibit poor rejection at frequencies of interest. Some existing approaches utilize digital FIR filters that use moving or weighted average values and a multiplier and an adder circuit. Trade-offs of similar approaches include a requirement for relatively large processing power.

A simpler and less costly method is the use of a sinc filter, i.e., a low-cost subset of a digital FIR filter that allows placing nulls at the line frequency and its harmonics to filter out excessive line or system noise. However, no known methods exist that applies sinc filtering methods to a multi-sample sequence, such as a multi-channel systems operating on a collection of battery cells in a battery pack. Instead, existing BMS systems apply filtering to one channel at a time, such that each channel uses its own sampling rate.

Accordingly, what is needed are systems and methods to circumvent the complexity or trade-offs of existing designs by taking advantage of the properties of sinc filters to filter out unwanted signals, while, at the same time, enabling the sampling of multi-channel systems at sufficiently high rates.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures may be not to scale.

FIG. B is a general illustration of filter characteristics for a common IIR filter and an 8 Tap FIR filter.

DETAILED DESCRIPTION OF EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

It shall be noted that: (1) certain steps may optionally be performed; (2) steps may not be limited to the specific order set forth herein; (3) certain steps may be performed in different orders; and (4) certain steps may be done concurrently.

Furthermore, it shall be noted that embodiments described herein are given in the context of battery management systems, but one skilled in the art shall recognize that the teachings of the present disclosure are not limited to battery management applications and may equally be used in other contexts that comprise multi-channel data inputs.

In signal processing, a sinc filter is a specific type of FIR filter that has a moving average length and that ideally removes all frequency components at specific notch frequencies while allowing frequency components outside of the notch locations to pass. In the time domain, its impulse response is a sinc function. In addition, the sinc filter is known to have a linear phase response.

Figure 1A:
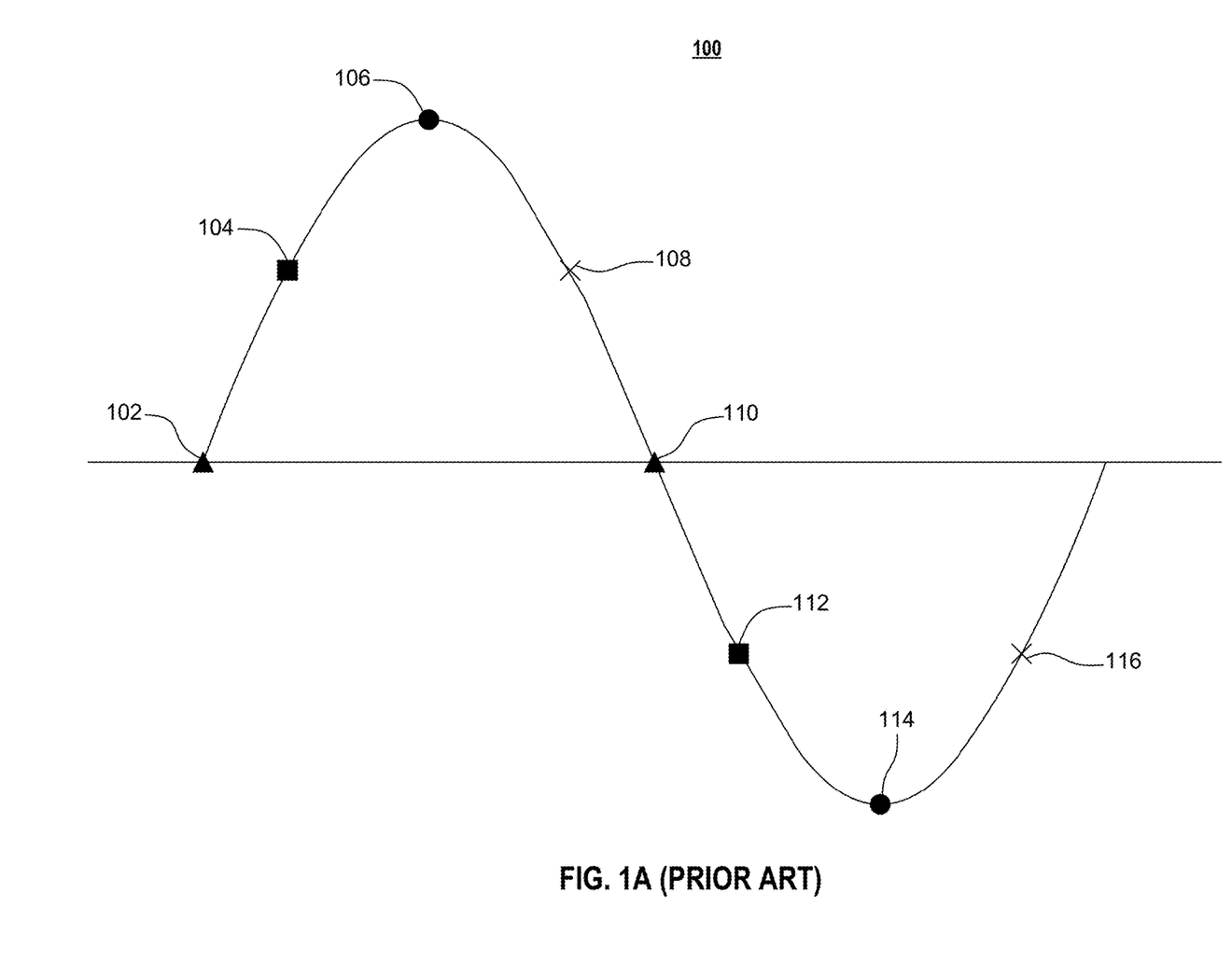
FIG. 1A shows a sinusoidal waveform to illustrate frequency cancelation examples.

FIG. 1A shows a sinusoidal waveform to illustrate frequency cancelation examples. Sampling theory provides that if sinusoidal waveform 100 is sampled at an integer multiple of its frequency over an integer number of periods, when filtered/averaged, the set of samples taken during each period of the sinusoidal input will cancel out, and the waveform will be effectively notched out of the sampled output data. Therefore, if the sampling frequency $F_{Sample}$ divided by the number of samples averaged (Oversampling Rate, or OSR) coincides with a noise frequency, the resulting sinc filter response will generate notches that advantageously may be used to place nulls at integer multiples of a noise frequency so as to remove unwanted signals and harmonics, e.g., to filter out the effects of line or system noise.

This can be demonstrated as follows. Dual-sample pairs separated by 180° would result if sinusoidal signal 100 was sampled at $F_{Sample}=2*F_{Sin}$ with an OSR=2. Dual-sample pairs at 0° and 180° (102, 110) would cancel when averaged, yielding no sinusoidal content. This relationship would hold for any initial phase, e.g. 45° and 225° (104, 112), 90° and 270° (106, 114), etc. Four-sample sets separated by 90° would result if sinusoidal signal 100 was sampled at $F_{Sample}=4*F_{Sin}$ with an OSR=4; e.g., for a starting phase of 45°, 104, 108, 112, and 116 would be the resulting sample set, which would cancel out if averaged. Eight-sample sets separated by 45° would result if sinusoidal signal 100 was sampled at $F_{Sample}=8*F_{Sin}$ with an OSR=8; e.g., for a starting phase of 0°, (102-116) would be the resulting sample set, which would cancel out if averaged. One skilled in the art can easily show that the progression would continue for any integer OSR selected greater than one, regardless of initial phase.

Figure 1B:
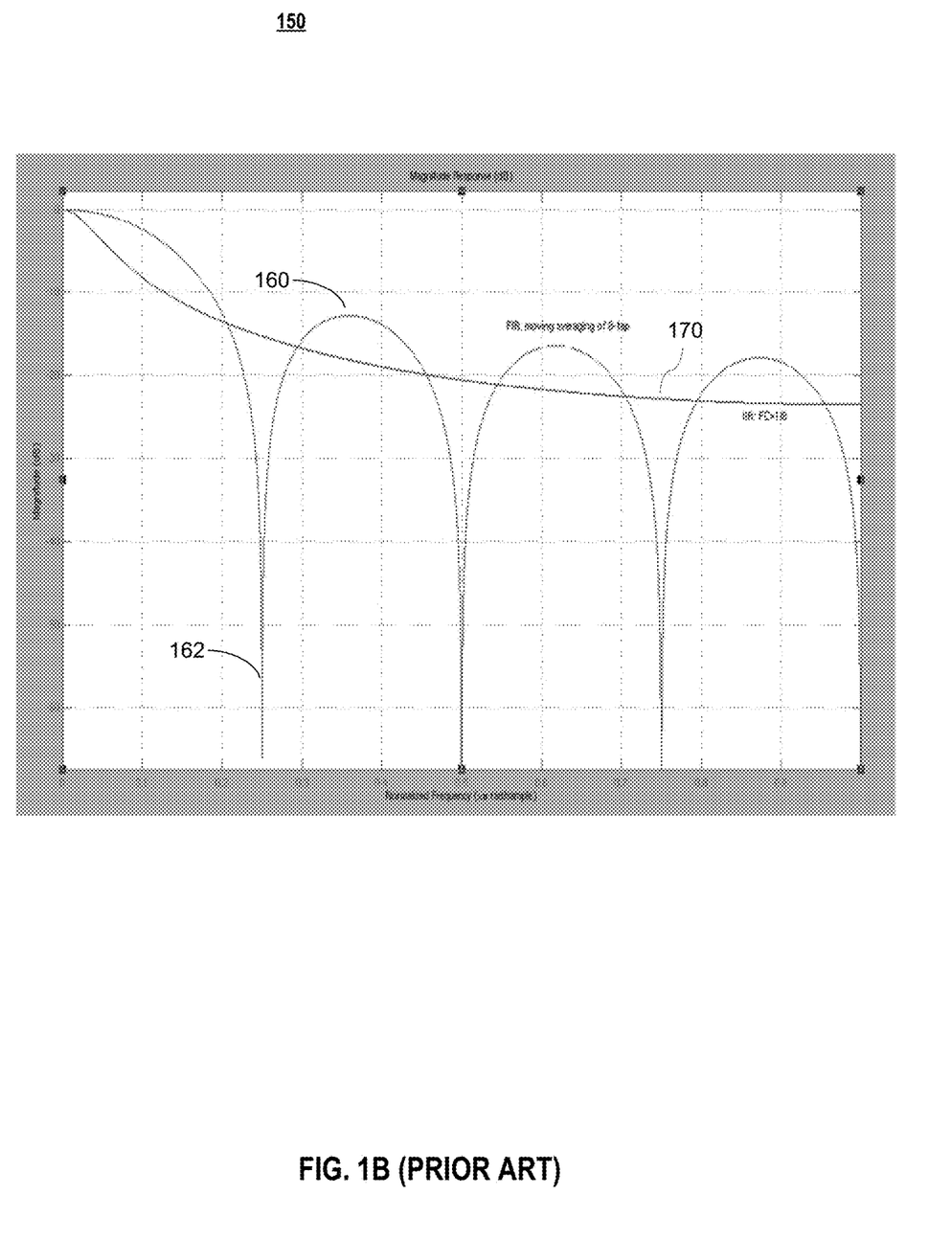

FIG. 1B is a general illustration of filter characteristics for a common IIR filter and an 8 Tap FIR filter. Graph 150 is shows a normalized frequency response that illustrates locations of nulls for a common sinc filter. As depicted, FIG. 1B is normalized to the Nyquist frequency ($F_{Sample}/2$) and illustrates a frequency response for an 8X OSR application. It is known that an averaging oversampled accumulator essentially implements a sinc filter that has an oversampling rate equal to $N_{Tap}$. The resulting sinc filter is an inherently stable, true "moving average," filter i.e., it has no dependency on previous samples, unlike an IIR filter that is a regenerative filter whose output is the weighted average of the most recent input value and an accumulation of all previous output values, and as a result, delivers little attenuation at the frequencies of interest.

If the sample frequency, $F_{Sample}$, of measurements within an oversampled/averaged scan is fixed, then the sinc noise filtering transfer function applies, which is equivalent to a Burst Mode Sampled application. The locations of the notches are determined by the sample frequency, $F_{Sample}$, and $N_{Tap}=OSR$.

In detail, notches are located at $n*F_{Sample}/N_{Tap}$ (for n=1 to $N_{Tap}-1$). As depicted in the example in FIG. 1B, 100 Hz rejection may be implemented with 8X OSR at $F_{Sample}=800$ Hz; 100 Hz rejection is also possible at 16X OSR at $F_{Sample}=1.6$ kHz, and so forth. Similarly, simultaneous 50 Hz and 100 Hz rejection is facilitated at 16X OSR at $F_{Sample}=800$ Hz, or 32X OSR at $F_{Sample}=1.6$ kHz, and so forth.

Overall, an appropriate selection of $F_{Sample}$ and OSR allows notches to be placed at desired locations, e.g., at a known noise frequency in order to reject or reduce noise at that frequency. For example, in order to reduce line noise, a notch may be placed at the mains frequency, with the level of rejection achieved subject to the accuracy of the oscillator frequency controlling the sequencer. In addition, the selection of $F_{Sample}$ and OSR allows notches to be placed at other locations of known noise, such as harmonics of the line noise.

Figure 2:
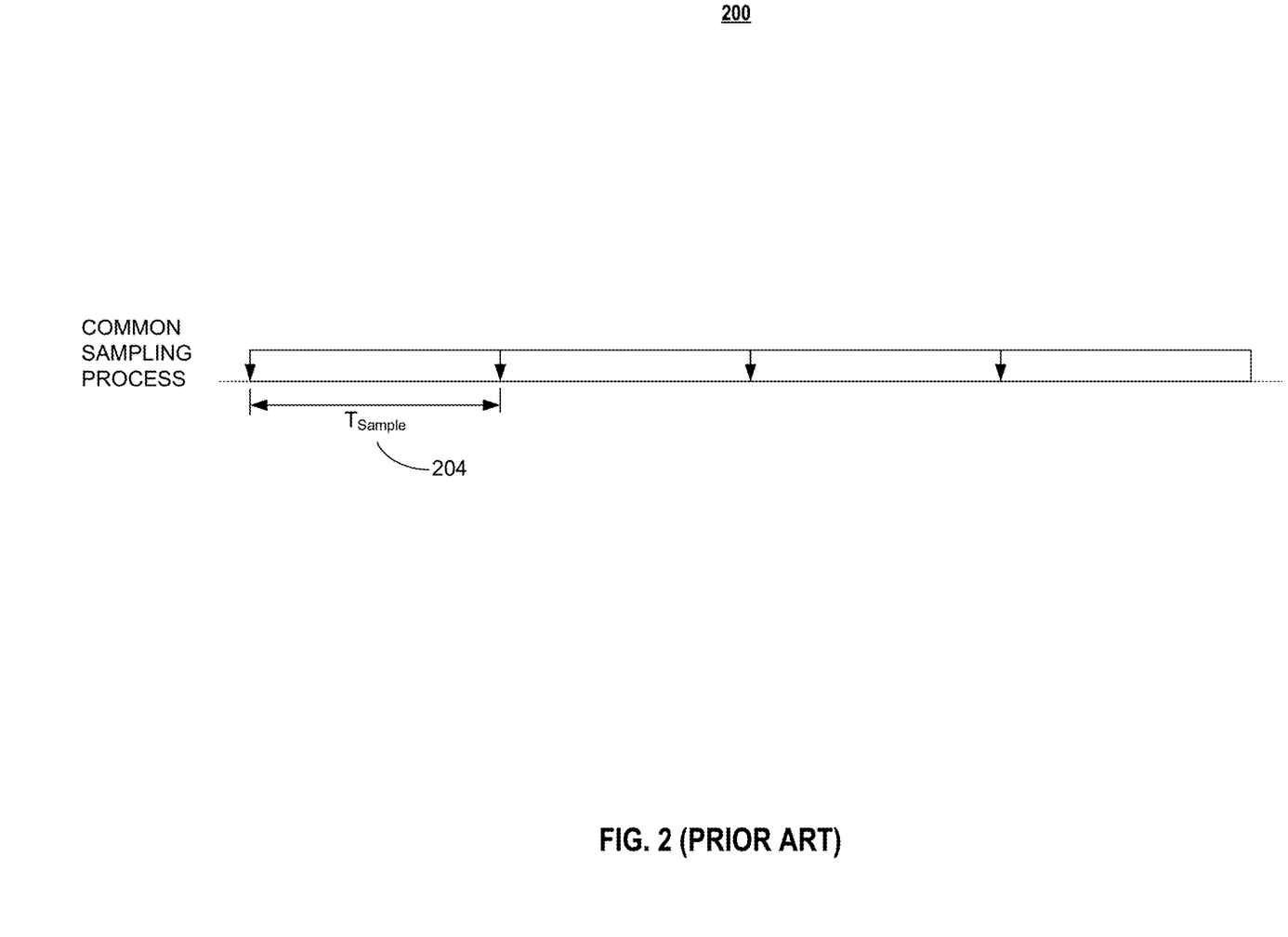
FIG. 2 shows a timing diagram for a common sampling process for a signal sampled at a sampling frequency $F_{Sample} = 1/T_{Sample}$.
Figure 3A:
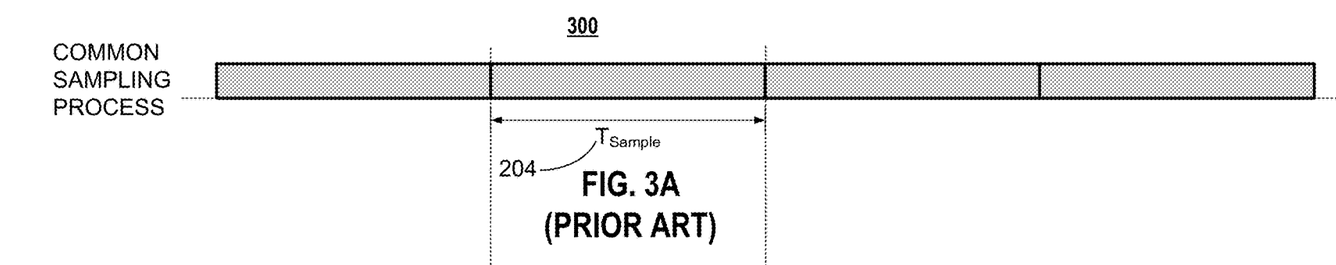
FIG. 3A shows the same timing diagram for a common sampling process as in FIG. 2.

FIG. 2 and FIG. 3A show a timing diagram for a common sampling process given a sampling frequency $F_{Sample}$ and corresponding sampling period $T_{Sample}$ 204. In a common battery management system that comprises multiple channels, noise filtering is typically applied individually to each channel, one at a time, such that each input channel is independently sampled at its own sampling rate, here, $F_{Sample}$ 204. For example, data from one cell of a battery is sampled and a filtering scheme is applied to that channel before filtering is applied to the next channel, e.g., until a battery management system has measured and read out all cells. For obvious reasons, this approach is rather cumbersome and expensive. Therefore, it would be desirable to utilize sinc filtering for reducing or eliminating noise in more than one channel at a time, so as to enable true multi-channel sampling.

Figure 3B:
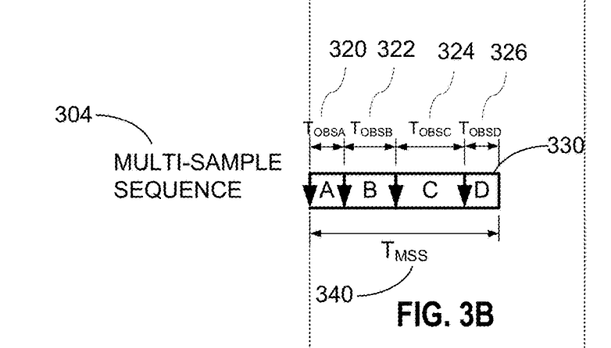
FIG. 3B illustrates a multi-sample sequence for filtering noise on four exemplary channels, according to various embodiments of the present invention.

FIG. 3B illustrates a multi-sample sequence for filtering noise on four exemplary channels, according to various embodiments of the present invention. For purposes of comparison, FIG. 3A shows the same timing diagram for a common sampling process as in FIG. 2. In FIG. 3B, an observation period $T_{OBS}$ (e.g., 320, 322, 324, 326) represents the time for measuring and converting data on an input or channel (e.g., channel A, B, C, and D, respectively). In embodiments, $T_{OBS}$ may be known or obtained based on specific characteristics of the channel, e.g., channel impedance, environmental factors, signal path, etc., and the sampling/conversion operation. As illustrated by FIG. 3B, there is no requirement that for sample or conversion operations $T_{OBS}$ be identical for each of the inputs or channels. Rather, in embodiments, the duration of the sample or conversion operation, i.e., $T_{OBS}$ 320, 322, 324, 326, should be repeatable and periodic for individual inputs or channels.

In embodiments, each channel may be measured at a certain time relative to another channel. The measurements may be spaced at any interval, e.g., linearly at equal intervals, as long as the sum of all observation periods $\Sigma T_{OBS}$ can be completed within a given sampling period, here, $T_{Sample}$ 204. As can be readily gleaned from FIG. 3C, if this criterion can be met, the effective sampling frequency $T_{SampleA-D}$ 312, 314, 316, 318 will be equal to $T_{Sample}$ 204, as will become apparent from the description in the following paragraphs.

Figure 3C:
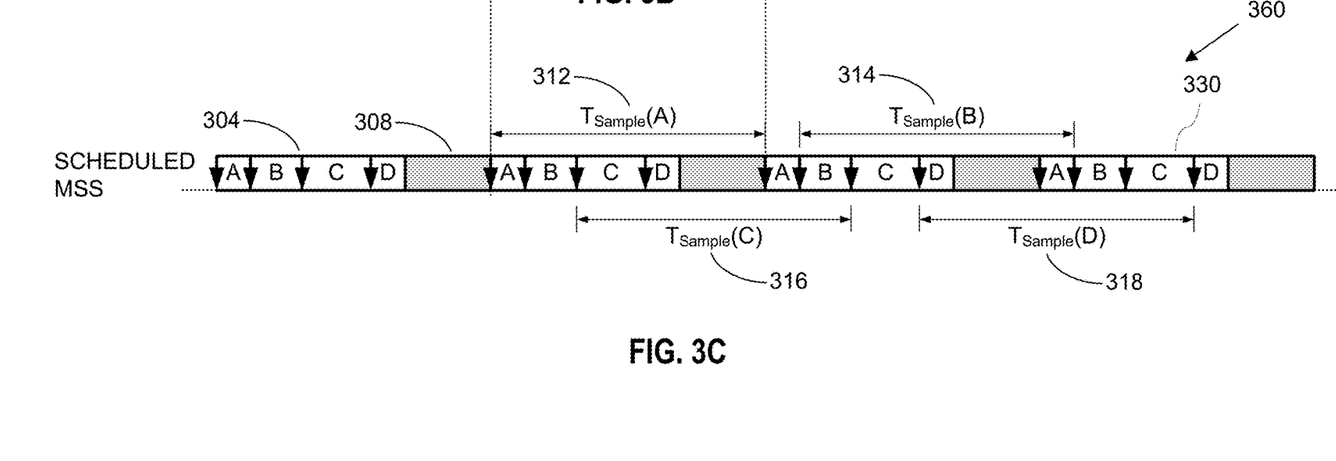
FIG. 3C illustrates a timing diagram for a multi-sample sequence scheduling process for filtering noise on four exemplary channels, according to various embodiments of the present invention.

As depicted in FIG. 3B, multi-sample sequence 304 comprises the sampling and conversion of four channels 330, labeled A-D in FIG. 3B and FIG. 3C, that have been sampled within the multi-sample time period $T_{MSS}$ 340. In embodiments, a channel 330, e.g., B, is sampled after a previous channel 330, e.g., A, has been sampled, here, during observation period $T_{OBSA}$ 320, such that sample B is taken after the sampling circuit has completed the sampling of sample A and is now in a condition that allows to resume sampling, here during observation period $T_{OBSB}$ 322. It is understood that any observation period may comprise a built-in delay time, such as a processing delay time or a settling time for an ADC.

FIG. 3C illustrates a timing diagram for a multi-sample sequence scheduling process for filtering noise on four exemplary channels, according to various embodiments of the present invention. In embodiments, a scheduling process 360 may be used to enable sinc/FIR filtering on two or more channels 330 that are sampled within secondary multi-sample sequence 304. The scheduling process facilitates noise rejection in channels 330 at a number of predetermined frequencies, each frequency being associated with a sampling period $T_{Sample}A$ 312, $T_{SampleB}$ 314, $T_{SampleC}$ 316, and $T_{SampleD}$ 318 that, here, are identical in length and equal to $T_{Sample}$ 204, i.e., the channels 330 reject the same frequencies, e.g., a fundamental frequency and its harmonics. In embodiments, this may be accomplished under certain circumstances discussed below, such that sinc/FIR noise filtering according to various embodiments disclosed herein may be applied to multi-sample sequence 304 that comprises the sampling of a number of inputs or channels 330.

As depicted in FIG. 3C, multi-sample sequence 304 may be followed by a period of time 308, such as a dead time in which no sampling operations related to multi-sample sequence 304 are performed. In embodiments, time 308 may also comprise a time for performing computing operations, auxiliary operations, diagnostic operations, or simply no operations at all.

As can be observed from the example in FIG. 3C, multi-sample sequence 304 may occur in periodic time intervals. As a person of skill in the art will appreciate, the duration of multi-sample sequence 304 should be less than $T_{Sample}$, such as to afford sufficient time for all observations to be made and processed prior to the launch of the next multi-sample sequence. As illustrated in FIG. 3B and FIG. 3C, in embodiments, the total time $T_{MSS}$ allotted for a multi-sample sequence may be chosen to be less than a desired sampling period $T_{Sample}$ 204 and 312-318, i.e., $T_{MSS} \leq T_{Sample}$, such that all measuring operations may be scheduled to fit into $T_{Sample}$. This may be expressed as:

$$T_{MSS} \Sigma_{i=1}^{nCH} T_{Obs\_j}$$

In embodiments, a scheduling process may be run, e.g., at a sample frequency, $F_{Sample}$, and periodically call multi-sample sequence 304. As a result, the benefits of noise filtering may be realized for any number of inputs or channels included in scheduled multi-sample sequence 360.

In embodiments, once the above criteria are met, a suitable $F_{Sample}$ or $T_{Sample}$ 204 and 312-318 may be selected to reject noise in a multi-sample sequence application. For example, 1.60 kHz at 32x OSR may reject a 50 Hz mains signal as well as harmonics of the mains signal. Similarly, 1.92 kHz at 32x OSR may reject a 60 Hz mains signal and its harmonics, respectively.

In embodiments, in addition to sampling and conversion operations, a multi-sample sequence may comprise other operations, e.g., as long as criteria for facilitating the effective sample rate $T_{Sample}$ 204 are met.

Overall, by selecting a proper combination of OSR and $F_{Sample}$, noise at any frequency of concern may be attenuated or eliminated. For example, instead of a reducing excessive noise at the mains frequency and its harmonics, frequencies associated with a system clock rate in an automotive application may also be rejected, as there is no limitation on the noise frequency that may be targeted.

Figure 4:
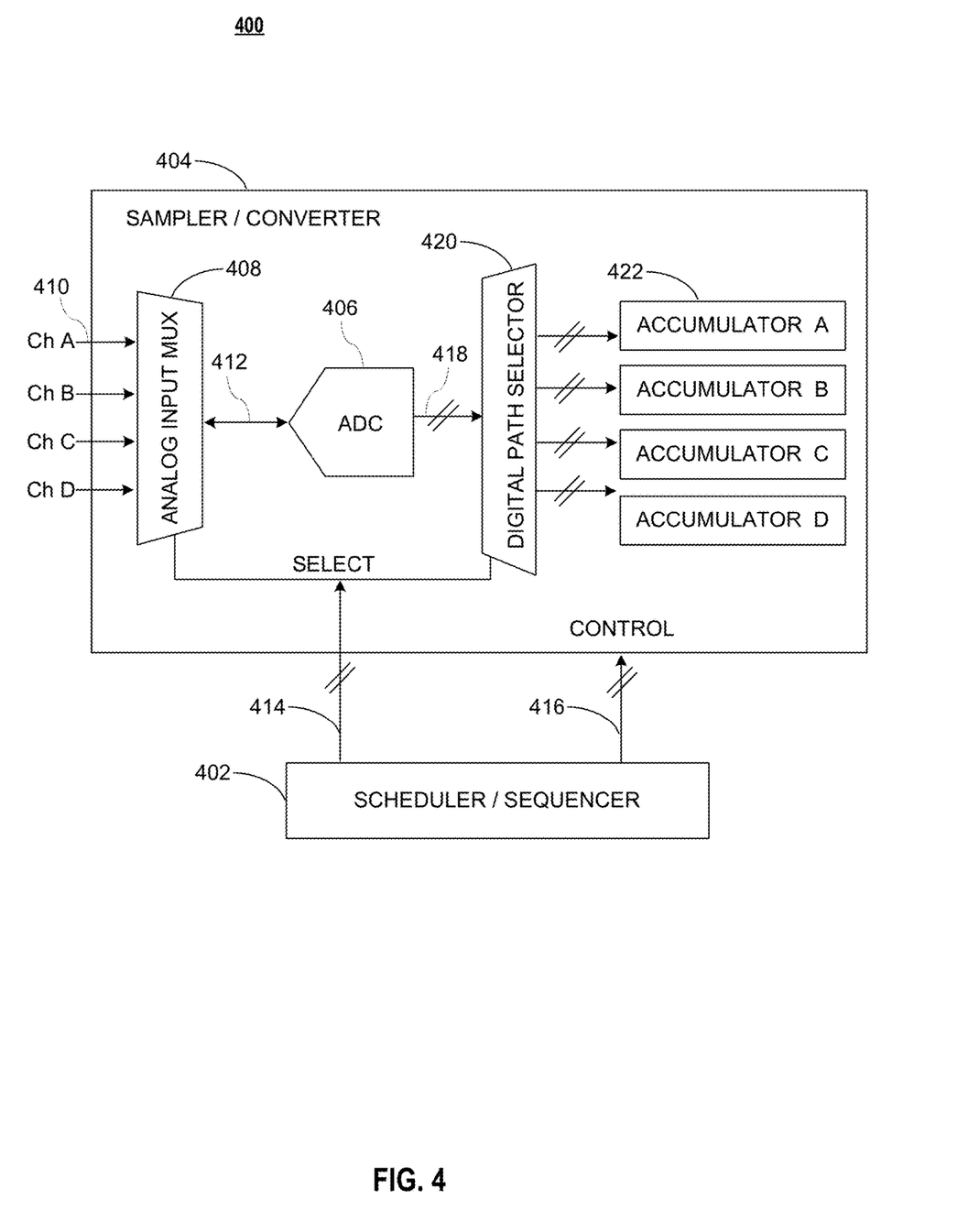
FIG. 4 illustrates a system that implements a multi-sample sequence scheduling process for filtering noise, according to various embodiments of the present invention.

FIG. 4 illustrates a system that implements a multi-sample sequence scheduling process for filtering noise according to various embodiments of the present invention. System 400 comprises scheduler (or sequencer) 402, and sampler (or converter) system 404. As depicted in FIG. 4, sampling system 404 may comprise ADC 406, an analog input multiplexer 408, digital path selector 420, and accumulators 422. In embodiments, scheduler 402 may be, e.g., an asymmetric, standalone scheduler that comprises one or more controllers, such as a finite state machine or a microprocessor.

In operation, scheduler 402 may be configured to control input multiplexer 408, e.g., via select signal 414, to select input channels 410. In embodiments, scheduler 402 may be configured to also realize, e.g., via control signal 416, an overall sampling frequency $T_{Sample}$.

In embodiments, once ADC 406 outputs observation data 418, selection signal 414 may be used by digital path selector 420 to route the data to accumulator (or filter) 422 corresponding to the selected input channel. In embodiments, sequencer 402 may continue the selection process to facilitate a desired multi-sample sequence (MSS), and then repeat the MSS process at the desired sample frequency $F_{Sample}$, until sufficient samples are gathered, to satisfy the desired OSR.

In embodiments, multiplexer 408 may receive input signals 410, e.g., analog voltages that are measured at a number of cells in a battery stack, and multiplex signals 410 to output signal 412 that may then be provided to the input of ADC 406. In embodiments, a number of selected input signals 410 is sampled within a single period and in an arbitrary but fixed order, e.g., according to an order of cells in the battery stack, as determined by scheduler 402. In embodiments, scheduler 402 determines timing and/or order in which input signals 410 are sampled and, thus, sets initial phase for input signals 410; however, as previously discussed, the relative phase of input signal 410 has no impact on the attenuation achieved. In embodiments, ADC 406 may be coupled to multiplexer 408 to sample any number of signals 410 according to rules determined by scheduler 402.

In embodiments, scheduler 402, in conjunction with sampling system 404, by oversampling at a predetermined sampling rate, $F_{Sample}$, forms a sinc/FIR filter that places notches at known frequency locations to reject unwanted common mode or line noise at those frequencies and their harmonics, e.g., when charging a battery. It is understood that the combined "filter characteristics" of system 400 may be varied to provide filtering at any desired frequency and its harmonics, e.g., depending on a wide variety of application and/or geography. In embodiments, system 400 implements the methods described with reference to FIG. 3 and FIG. 5, and may be particularly useful in a battery management system that, otherwise, may be negatively impacted by the underwired side-effects a rectifier circuit that is used for charging a vehicle battery or a clock used for managing system operations.

It is noted that configuration settings for scheduler 402 should remain consistent until sufficient samples are gathered to complete a full oversampled operation such as to ensure successful rejection of noise. Once the oversampled operation is complete, configuration settings may be freely modified to complete subsequent measurements as deemed necessary for a given application.

System 400 illustrated in FIG. 4 may be implemented on a chip and, in embodiments, may be utilized to manage a battery system. It is noted that system 400 is not limited to the constructional detail shown there or described in the accompanying text. As those skilled in the art will appreciate, multiplexer 408 may process any number of channels, and a suitable sampling system 404 may comprise any number of additional or different components, such as for storing, conditioning, and processing data.

In embodiments, for binary OSR implementations, advantageously, low silicon overhead may be used. For example, a right shift by M may be used to divide by a factor of $2^M$, where $2^M$ equals the oversampling rate. In embodiments, a simple adder may be used to accumulate the results, realizing an $N_{Tap}$ sinc filter represented by accumulators 422. If desired, a more complex FIR filter may be installed in lieu of accumulators 422 to enable more complex filter responses, which may come at the cost of additional silicon, processing, or hardware requirements.

Figure 5:
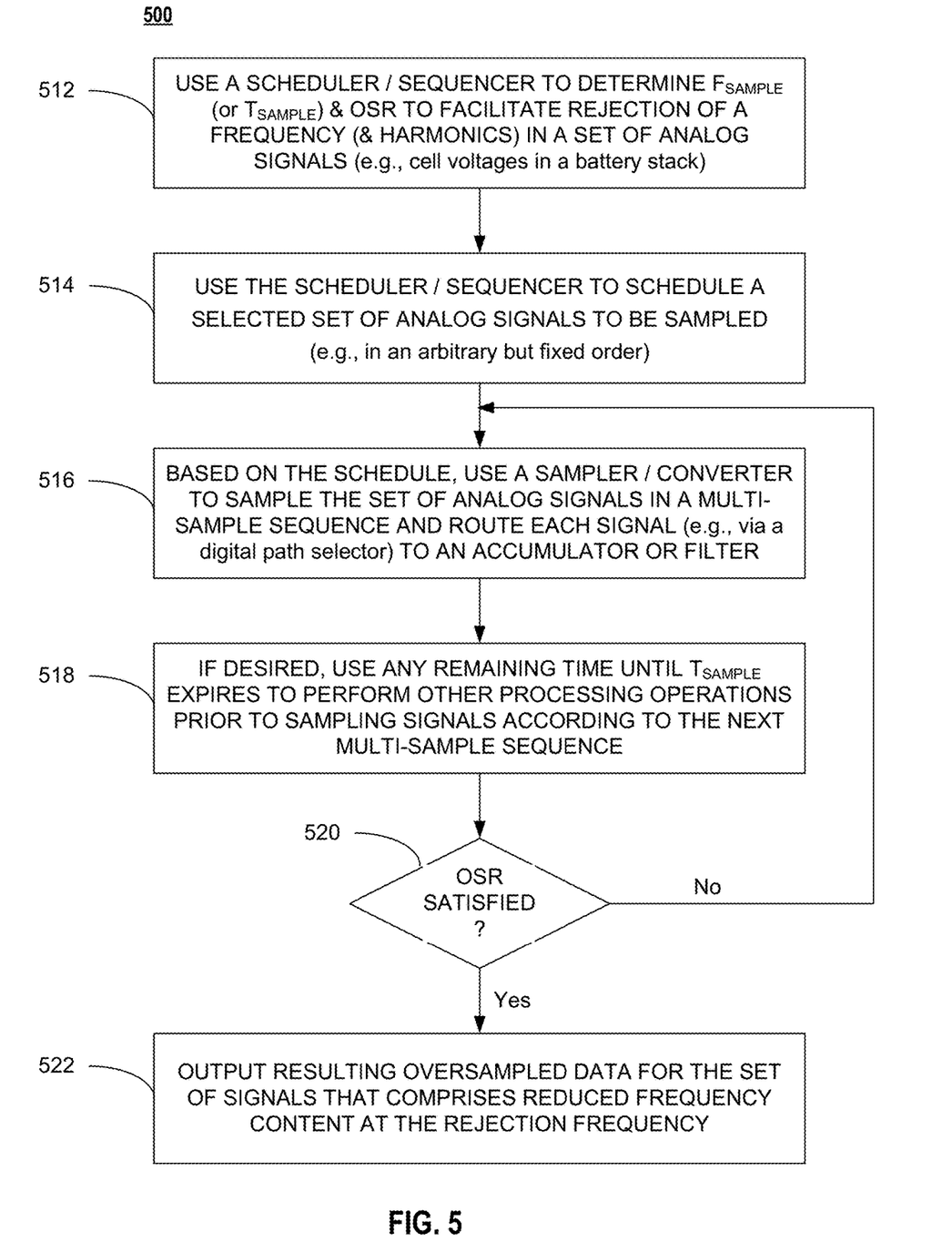
FIG. 5 is a flowchart of an illustrative process for noise cancellation in accordance with various embodiments of the present disclosure.

FIG. 5 is a flowchart of an illustrative process for noise cancellation in accordance with various embodiments of the present disclosure. Noise cancellation process 500 begins at step 512, by determining a sampling frequency, $F_{Sample}$ (or corresponding $T_{Sample}$), and an oversampling ratio (OSR) in a manner such that the combination of $F_{Sample}$ (or $T_{Sample}$) and OSR may be used to facilitate a rejection (or attenuation) of a specific frequency (and its harmonics) in a set of analog signals. In embodiments, $F_{Sample}$ and OSR may be selected by a scheduler (or sequencer), e.g., based on user input. In embodiments, the selection may consider, in addition to frequency rejection, any accuracy or wide-band noise rejection requirements. In embodiments, the scheduler may select the analog signals from a plurality of analog signals, such as cell voltages in a battery stack.

At step 514, the scheduler may schedule a selected set of analog signals to be sampled by a sampling system (or converter), e.g., in an arbitrary but fixed order. In embodiments, scheduling may comprise creating and ordering, e.g., a sequence of a number of cells from which to sample voltages during the sampling period. In embodiments, scheduling may be accomplished, e.g., by a dedicated scheduler or a processor. It is understood that the sum of the observation times for the selected signals (i.e., channels) should be less than the time $T_{Sample}$ afforded in step 512.

Once the scheduler is configured, it may initiate an oversampled multi-sample conversion process, at step 516, in which a sampler is used to sample the set of selected and ordered analog signals in a multi-sample sequence according to the schedule determined in step 514. In embodiments, the sampler comprises a sampling circuit that, at varying times, receives the signals from the input channels, samples each signal in a multi-sample sequence, and routes each signal (e.g., via a digital path selector) from an input channel to an accumulator or filter.

It is understood that the scheduler should afford each signal, e.g., each input channel, an observation time that allows to complete and process the measurement prior to taking samples for the next signal in the multi-sample sequence. In embodiments, if the input channels can be sampled in less time than afforded by $T_{Sample}$, at step 518, process 500 may wait for time $T_{Sample}$ to expire prior to continuing to sample signals according to the next multi-sample sequence. In embodiments, any time within $T_{Sample}$ that is not used for observation may be used, e.g., for additional processing operations.

At step 520, it is determined whether the OSR requirements determined by (or provided to) the scheduler in step 512 have been satisfied. If not, then process 500 may return to step 516 to repeat the multi-sample measurement sequence. Otherwise, if the OSR requirement has been satisfied, process 500 may resume with step 522 by outputting the resulting oversampled data for the set of signals that comprises rejected (or attenuated) frequency content in the nulls, as determined at step 512.

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 6:
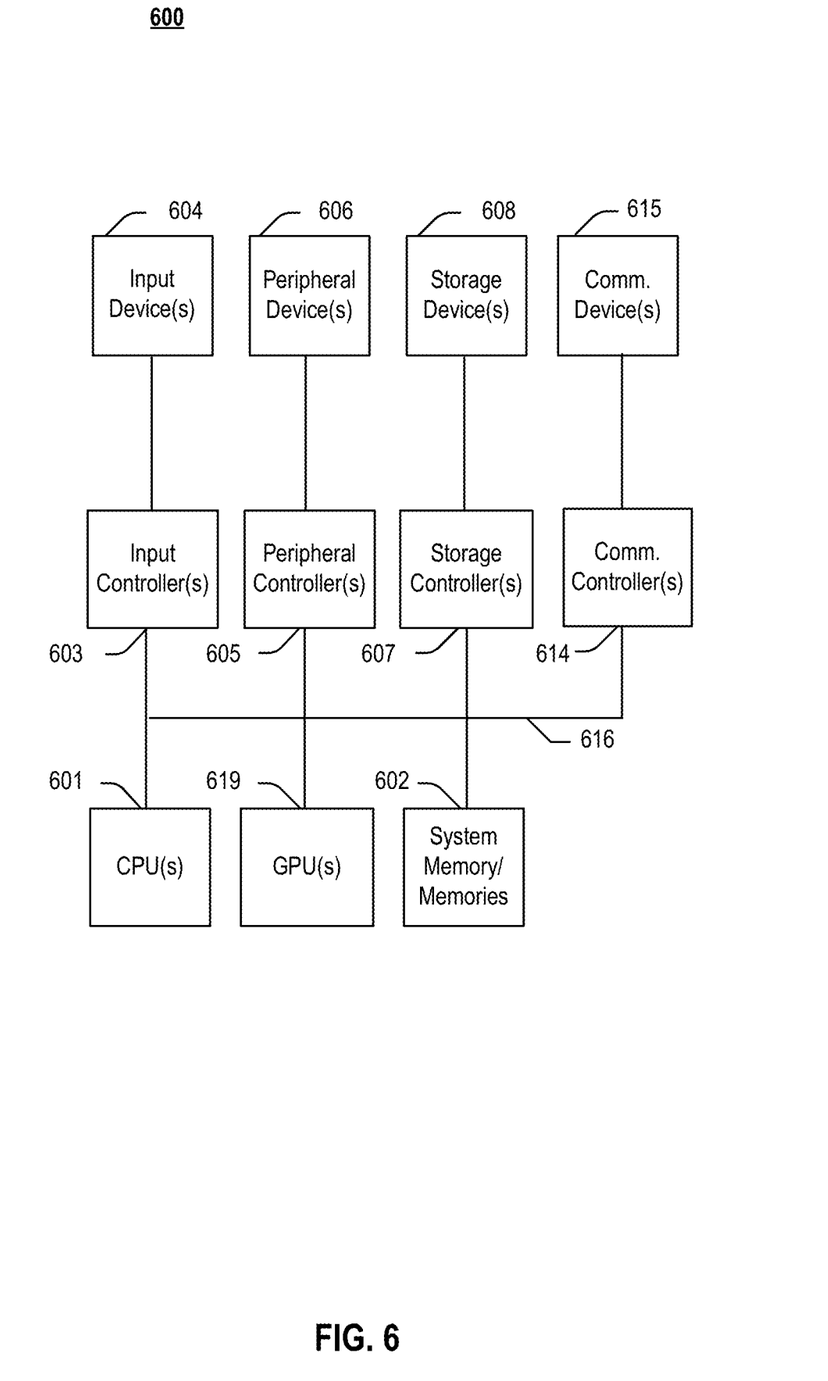
FIG. 6 depicts a simplified block diagram of a computing device/information handling system, in accordance with embodiments of the present disclosure.

FIG. 6 depicts a simplified block diagram of a computing device/information handling system (or computing system) according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more central processing units (CPU) 601 that provides computing resources and controls the computer. CPU 601 may be implemented with a microprocessor or the like, and may also include one or more graphics processing units (GPU) 619 and/or a floating-point coprocessor for mathematical computations. System 600 may also include a system memory 602, which may be in the form of random-access memory (RAM), read-only memory (ROM), or both.

A number of controllers and peripheral devices may also be provided, as shown in FIG. 6. An input controller 603 represents an interface to various input device(s) 604. The computing system 600 may also include a storage controller 607 for interfacing with one or more storage devices 608 that might be used to record programs of instructions for operating systems, utilities, and applications, which may include embodiments of programs that implement various aspects of the present invention. Storage device(s) 608 may also be used to store processed data or data to be processed in accordance with the invention. The computing system 600 may also include one or more peripheral controllers or interfaces 605 for one or more peripherals. A communications controller 614 may interface with one or more communication devices 615, which enables the system 600 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable media.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using application specific integrated circuits (ASICs), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks; optical media such as CD-ROMs and holographic devices; magneto-optical media; and hardware devices that are specially configured to store or to store and execute program code, such as ASICs, programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:
1. A multi-channel noise-filtering system comprising:
a scheduler that causes at least a first channel and a second channel to be selected from a multi-channel system;
a sampler that during a first time, based on an input from the scheduler, samples a first analog signal associated with the first channel and samples during a second time a second analog signal associated with a second channel, a sum of the first time and the second time being less than a time period, the time period being associated with a sampling rate that causes a signal in at least one of the first and second channels to be reduced at one or more frequencies, the sampler comprising:
an analog-to-digital converter that converts the first and second analog signals to digital signals;
a digital path selector that selects one or more channels to generate a multi-sample sequence to be accumulated; and
one or more accumulators or filters coupled to the digital path selector, the one or more accumulators or filters outputting one or more signals that are reduced at the one or more frequencies.

2. The multi-channel noise-filtering system according to claim 1, wherein the scheduler selects the first analog signal and the second analog signal to be periodically sampled in a predetermined order.

3. The multi-channel noise-filtering system according to claim 2, wherein the scheduler commences a subsequent multi-sample sequence in response to an expiration of the multi-sample sequence.

4. The multi-channel noise-filtering system according to claim 3, wherein the scheduler initiates processing steps prior to the expiration of the multi-sample sequence.

5. The multi-channel noise-filtering system according to claim 1, wherein the first and second analog signals are cell voltages in a battery stack.

6. The multi-channel noise-filtering system according to claim 1, wherein the one or more accumulators or filters output one or more signals in response to the scheduler determining whether an oversampling ratio has been satisfied.

7. The multi-channel noise-filtering system according to claim 6, wherein the scheduler determines the oversampling ratio and a sampling frequency that corresponds to the time period.

8. The multi-channel noise-filtering system according to claim 1, wherein the one or more accumulators or filters comprise one of an adder and an FIR filter.

9. The multi-channel noise-filtering system according to claim 1, wherein the first time is obtained based on a characteristic of the first channel.

10. The multi-channel noise-filtering system according to claim 9, wherein the characteristic is a channel impedance.

11. A multi-channel noise-filtering method for a multi-channel system, the method comprising:
using a sampler that during a first time, based on a scheduler input, samples a first analog signal associated with a first channel; and
using the sampler to sample during a second time a second analog signal associated with a second channel, such that a sum of the first time and the second time is less than a time period, the time period being associated with a sampling rate that causes a signal in at least one of the first and second channels being reduced at one or more frequencies, the first and second channels being selected to be sampled within a multi-sample sequence.

12. The multi-channel noise-filtering method according to claim 11, wherein the first time comprises a first delay time for converting the first analog signal.

13. The multi-channel noise-filtering method according to claim 11, further comprising periodically sampling the first analog signal and the second analog signal in a predetermined order.

14. The multi-channel noise-filtering method according to claim 13, wherein the time period comprises a second delay time for processing the multi-sample sequence prior to a commencement of a subsequent multi-sample sequence.

15. The multi-channel noise-filtering method according to claim 11, wherein the one or more frequencies comprise a mains line frequency.

16. The multi-channel noise-filtering method according to claim 11, wherein the sampling rate generates a sinc filter.

17. The multi-channel noise-filtering method according to claim 11, further comprising outputting one or more signals in response to-determining whether an oversampling ratio has been satisfied.

18. The multi-channel noise-filtering method according to claim 11, further comprising determining an oversampling ratio and a sampling frequency that corresponds to the time period.

19. A multi-channel noise-filtering system comprising:
one or more processors; and
a non-transitory computer-readable medium or media comprising one or more sequences of instructions which, when executed by at least one of the one or more processors, causes steps to be performed comprising:
using a sampler that during a first time, based on a scheduler input, samples a first analog signal associated with a first channel; and
using the sampler to sample during a second time a second analog signal associated with a second channel, such that a sum of the first time and the second time is less than a time period, the time period being associated with a sampling rate that causes a signal in at least one of the first and second channels being reduced at one or more frequencies, the first and second channels being selected to be sampled within a multi-sample sequence.

20. The multi-channel noise-filtering system according to claim 19, wherein the sampling rate generates a sinc filter.

* * * * *